UNITED STATES PATENT OFFICE.

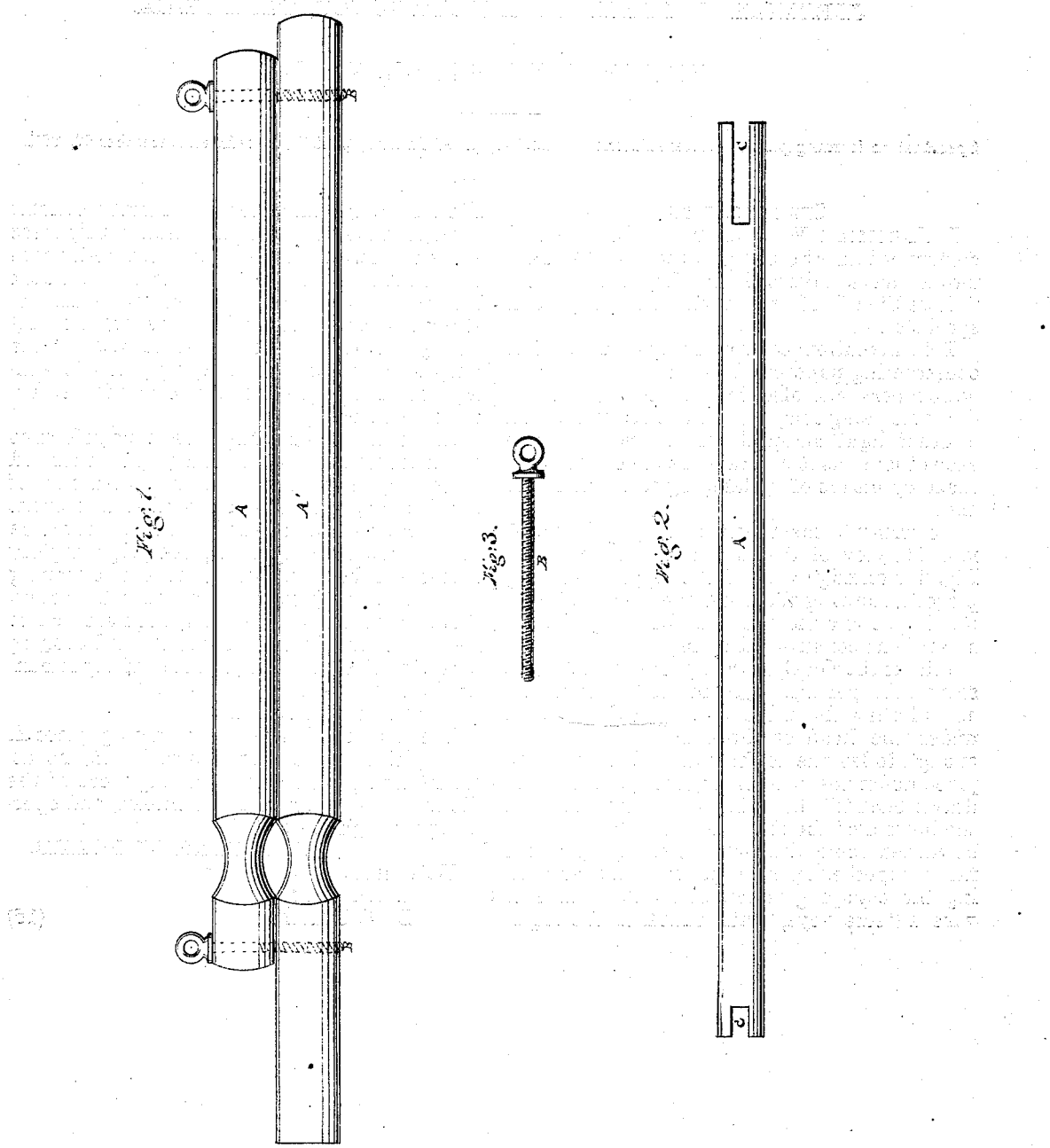

JEREMIAH W. FOARD, OF SAN FRANCISCO, CALIFORNIA.

IMPROVEMENT IN PAPER-FILES.

Specification forming part of Letters Patent No. 122,314, dated January 2, 1872; antedated December 20, 1871.

SPECIFICATION.

I, JEREMIAH W. FOARD, of the city and county of San Francisco, in the State of California, have invented an Improvement in "News-Files," of which the following is a specification:

This invention consists in a novel mode of constructing paper-holders for holding files of newspapers, and also documents and letters, the same being composed of two strips of wood or other light material, which are secured to each other so as to embrace the papers between them by means of a clamping-screw at either end.

Referring to the annexed drawing, Figure 1 is a side view of the file or holder complete. Fig. 2 is an edge view of the upper clamping piece A, showing the slot C at either end thereof. Fig. 3 is a view of the clamping thumb-screw B as constructed by me.

I make the slot C, in the upper end of A, just so much longer or deeper than in the lower end as will allow the piece to be pushed forward under the head of the clamping-screw far enough to let the lower end be brought into place under the head of its screw, and then be drawn back till the shank of the screw touches the bottom of the slot, when both screws will be turned home, drawing the clamping pieces firmly together upon the paper. In constructing the clamping thumb-screw B, I make of wire a "screw-eye," with shank of the requisite length and diameter, and insert its shank through a metal disk of the desired thickness and size down to the eye, and secure it there by means of solder on the upper side, the disk then becoming the head of the screw. A thumb-screw is not indispensable, however, as an ordinary round head screw would answer the purpose of holding the clamping pieces together; but to use the latter a screw driver becomes a necessity.

In the foregoing I have made no reference to the recess at the lower end of the file formed by cutting away a portion of the material of the clamping pieces, and intended to prevent the rupture of the newspaper at its lower edge consequent upon bringing the edge tightly across the hard substance of the clamping pieces in turning over the leaves of the paper, this particular matter having been secured to me by Letters Patent No. 54,320, and bearing date May first, A. D. one thousand eight hundred and sixty-six.

I claim as my invention—

The combination of the clamping piece A having slots C and clamping-screws B, the latter engaging the lower clamping piece of the file directly by means of its thread, and operating through the slot C.

JEREMIAH W. FOARD.

Witnesses:
R. ELLIOTT,
E. V. SUTTER. (15)